(12) United States Patent
Hargreaves et al.

(10) Patent No.: US 7,641,367 B2
(45) Date of Patent: Jan. 5, 2010

(54) HORTICULTURE LIGHT FIXTURE

(75) Inventors: Craig Hargreaves, Vancouver, WA (US); Darrin McDonald, Vancouver, WA (US)

(73) Assignee: IP Holdings LLC., Vancouver, WA (US)

( * ) Notice: Subject to any disclaimer, the term of this patent is extended or adjusted under 35 U.S.C. 154(b) by 65 days.

(21) Appl. No.: 12/082,943

(22) Filed: Apr. 16, 2008

(65) Prior Publication Data
US 2009/0262540 A1    Oct. 22, 2009

(51) Int. Cl.
F21V 17/00    (2006.01)
(52) U.S. Cl. .................. 362/375; 362/147; 362/368
(58) Field of Classification Search .............. 362/362, 362/373, 375, 364, 147, 368
See application file for complete search history.

(56) References Cited

U.S. PATENT DOCUMENTS 3,983,387 A * 9/1976 Van Steenhoven et al. .. 362/375
4,155,111 A * 5/1979 Kelly et al. ................. 362/374
6,059,424 A * 5/2000 Kotloff ....................... 362/220

* cited by examiner

Primary Examiner—Gunyoung T Lee
(74) Attorney, Agent, or Firm—Robert J. Ireland; Ireland and Ireland

(57) ABSTRACT

A horticulture light fixture having a secure glass aperture and glass retention frame that is swingably hinged to provide easy and safe maintenance of the fixture and helps facilitate cleaning of the glass. The hinge portion is constructed from sheet metal that is formed during the fabrication of the fixture. The method of construction eliminates the need to install a separate hinge saving manufacturing time and expense. In a preferred embodiment, the glass retention frame is constructed from a single continuous sheet of metal, that is punched or cut into desired dimension and shape, formed or folded to hold a flat piece of glass, and installed using common pins that provide rotational motion for swingably opening and closing of the glass simplifying maintenance of the horticulture light fixture.

4 Claims, 7 Drawing Sheets

HORTICULTURE LIGHT FIXTURE

TECHNICAL FIELD OF THE INVENTION

This invention relates generally to a horticulture light fixture constructed from sheet metal having a hinged glass retention frame.

BACKGROUND OF THE INVENTION

The use of artificial light to grow plants is well known in the art and many different types of grow lamps and horticulture light fixtures are utilized by the private and commercial gardener. A key problem in designing horticulture light fixtures is integrating user friendly maintenance features. The glass portion isolating the grow lamp from the plants gets dirty and needs to be cleaned. The grow lamp itself requires periodic replacement. The easiest and simplest way to perform maintenance is with the fixture hanging. Having a hinged assembly that swings open to provide access to the glass and grow lamp is necessary. Constructing the hinged assembly from inexpensive sheet metal during the forming process of the horticulture light fixture is advantageous and economical.

OBJECTS AND SUMMARY OF THE INVENTION

Accordingly, it is an object of the invention to provide a horticulture light fixture having a secure glass aperture that is swingably hinged to facilitate easy and safe maintenance of the fixture and cleaning of the glass.

Another object of the invention is to provide a sheet metal alternative to a piano type hinge.

A more specific object of the invention is to provide an inexpensive sheet metal alternative to more common and expensive hinging techniques.

A further specific object of the invention is to provide a method of constructing a glass retention frame including a hinge mechanism out of a continuous sheet of metal, thus reducing cost and expense of manufacture.

The foregoing and other objects and advantages of the invention will become further apparent from the following detailed description of the presently preferred embodiments, read in conjunction with the accompanying drawings. The detailed description and drawings are merely illustrative of the invention rather than limiting in that the drawings depict one possible configuration, the true scope of the invention being defined by the claims.

BRIEF DESCRIPTION OF THE DRAWINGS

Having described the invention in general terms and description, reference will be made to the accompanying figure drawings illustrating embodiments, in which.

| TABLE OF COMPONENTS | |
|---|---|
| 1 | Horticulture Light Fixture |
| 10 | Housing |
| 12 | First Cylindrical Vent |
| 14 | Second Cylindrical Vent |
| 20 | First End Plate |
| 21 | Lip |
| 25 | First Tab |
| 26 | Second Tab |
| 27 | First Fulcrum Hole |
| 28 | Second Fulcrum Hole |
| 30 | Second End Plate |
| 40 | Glass Retention Frame |
| 42 | Extending Tabs |
| 43 | Corner Rivet |
| 45 | First Edge |
| 46 | Second Edge |
| 47 | Third Edge |
| 48 | Fourth Edge |
| 50 | Glass Portion |
| 60 | First Hinge Pin |
| 65 | First Pin Nut |
| 70 | Second Hinge Pin |
| 80 | Securing Means |
| 82 | First Vertical Tab |
| 83 | Second Vertical Tab |
| 84 | Securing Hole |
| 86 | Barrel Fastener |
| 88 | Barrel Receiver |
| 90 | Hanger Means |
| 100 | First Flange |
| 101 | First Pivot Hole |
| 110 | Second Flange |
| 112 | Second Pivot Hole |
| 143 | Corner Hole |
| 160 | Folded Edge |

DETAILED DESCRIPTION OF THE INVENTION

Figure 1:
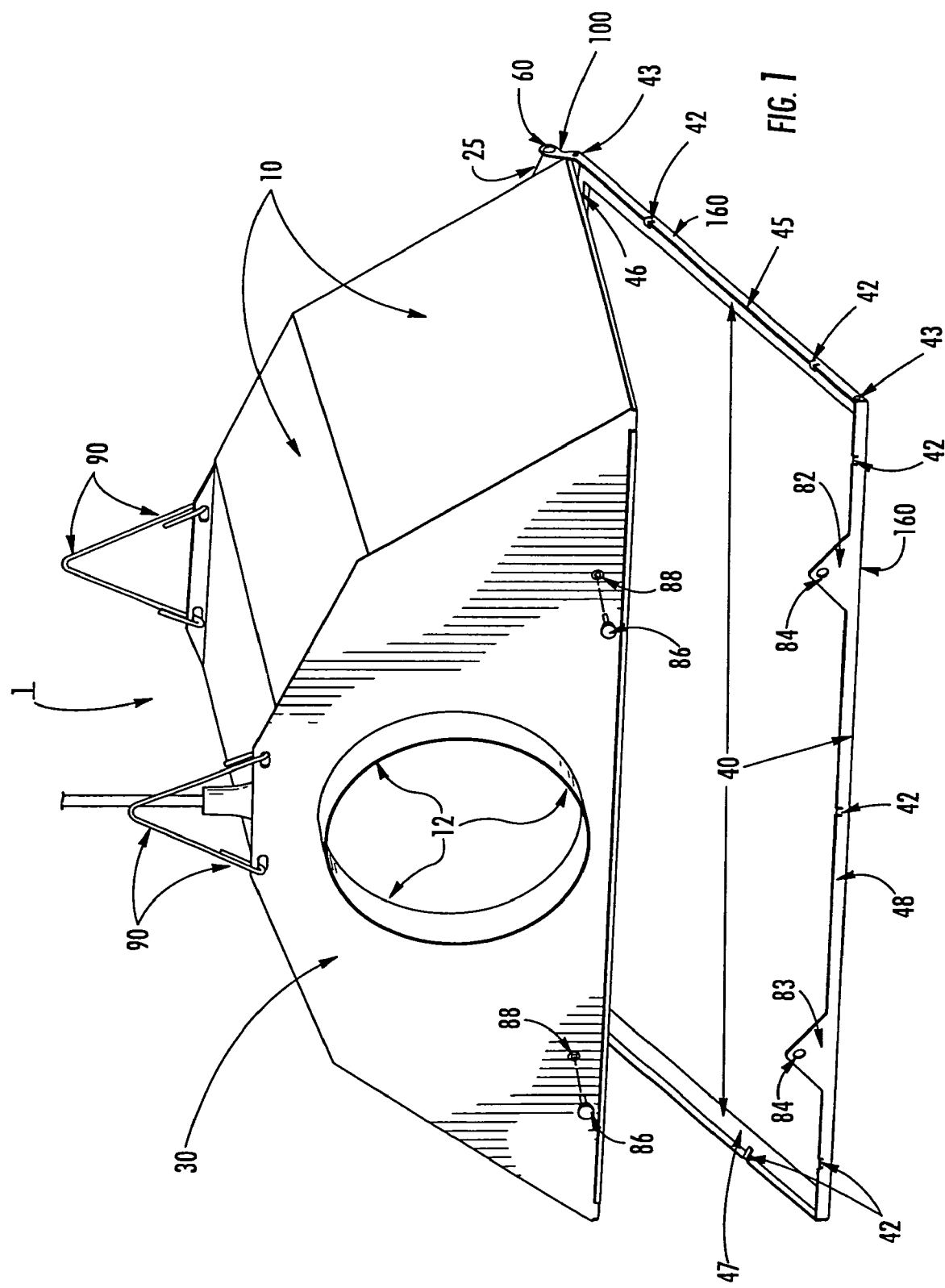
FIG. 1 is a perspective view of one embodiment wherein the horticulture light fixture 1 is illustrated having the glass retention frame 40 swung open from the housing 10 and second endplate 30.

FIG. 1:

FIG. 1 illustrates the one preferred embodiment of the horticulture light fixture 1 having a housing 10, a first endplate 20, a second endplate 30, and a glass retention frame 40. In practice, the glass retention frame 40 is opened to clean the glass, and closed when the horticulture lights fixture 1 is in use.

The housing 10 is bounded on each end by a first endplate 20 and second endplate 30. The glass retention frame 40 hingedly swings, the fulcrum being at the first endplate 20, and when the glass retention frame 40 swings closed, it fittingly matches the rectangular bottom edge formed by the housing 10, first endplate 20, and second endplate 30, securing at the second end plate 30 with barrel fasteners 86.

In other embodiments the glass retention frame 40 hingedly swings with the fulcrum being at the second endplate 30, or the fulcrum being located at both first endplate 20 and second endplate 30.

The horticulture light fixture 1 in practice hangs above the plants, said hanger means 90 shown attaching to top of housing 10. The first cylindrical vent 12 provides cooling atmosphere to the fixture, and is shown centered in the second end plate 30.

In the preferred embodiment, the glass retention frame 40 is constructed from a single and continuous sheet of metal being punched out or cut, folded or broke, and formed. The glass retention frame 40 has a first edge 45, second edge 46, third edge, 47, and fourth edge 48. The dimension and size of the glass retention frame 40 matches the rectangular bottom defined by the housing 10, first endplate 20, and second endplate 30. The bottom of the housing 10 doesn't have to be rectangular, it could be square, the preferred embodiment is shown rectangular as most fixtures have rectangular aperture for the light to pass through and on to the growing plants beneath.

On the first edge 45, a first flange 100 is located on the end adjacent to the second edge 46. The first flange 100 is formed vertically from the glass retention frame 40, matching the first tab 25 of the first endplate 20. As shown, the first hinge pin 60 initially passes through the first flange 100 and secondarily into the first tab 25, forming one side of the hinge structure, the fulcrum being defined by the location of the first hinge pin 60 relative to the glass retention frame 40 and first endplate 20. The hinge pin 60 may be cylindrical, or some other shape that provides rotation of the first flange 100 about the first hinge pin 60. The first hinge pin 60 may also be threaded on one end providing a threaded securing method. In the preferred embodiment, the location of the first hinge pin 60 is higher than the folded edge 160 of the glass retention frame 40.

The glass retention frame 40 along the fourth edge 48 has a first vertical tab 82 and second vertical tab 83, each having a securing hole 84. When the glass retention frame 40 is closed, the securing holes 84 align with the barrel receivers 88 located in the second end plate 30. Barrel fasteners 86 pass through the securing holes 84 and fasten into the barrel receivers 88.

Extending tabs 42 may be constructed from the same continuous sheet of metal that the glass retention frame 40 is constructed from. The extending tabs 42 are shown folded over as if they were retaining a piece of glass. A first corner rivet 43 may be used to secure the corners when a stronger glass retention frame 40 is desired.

Figure 2:
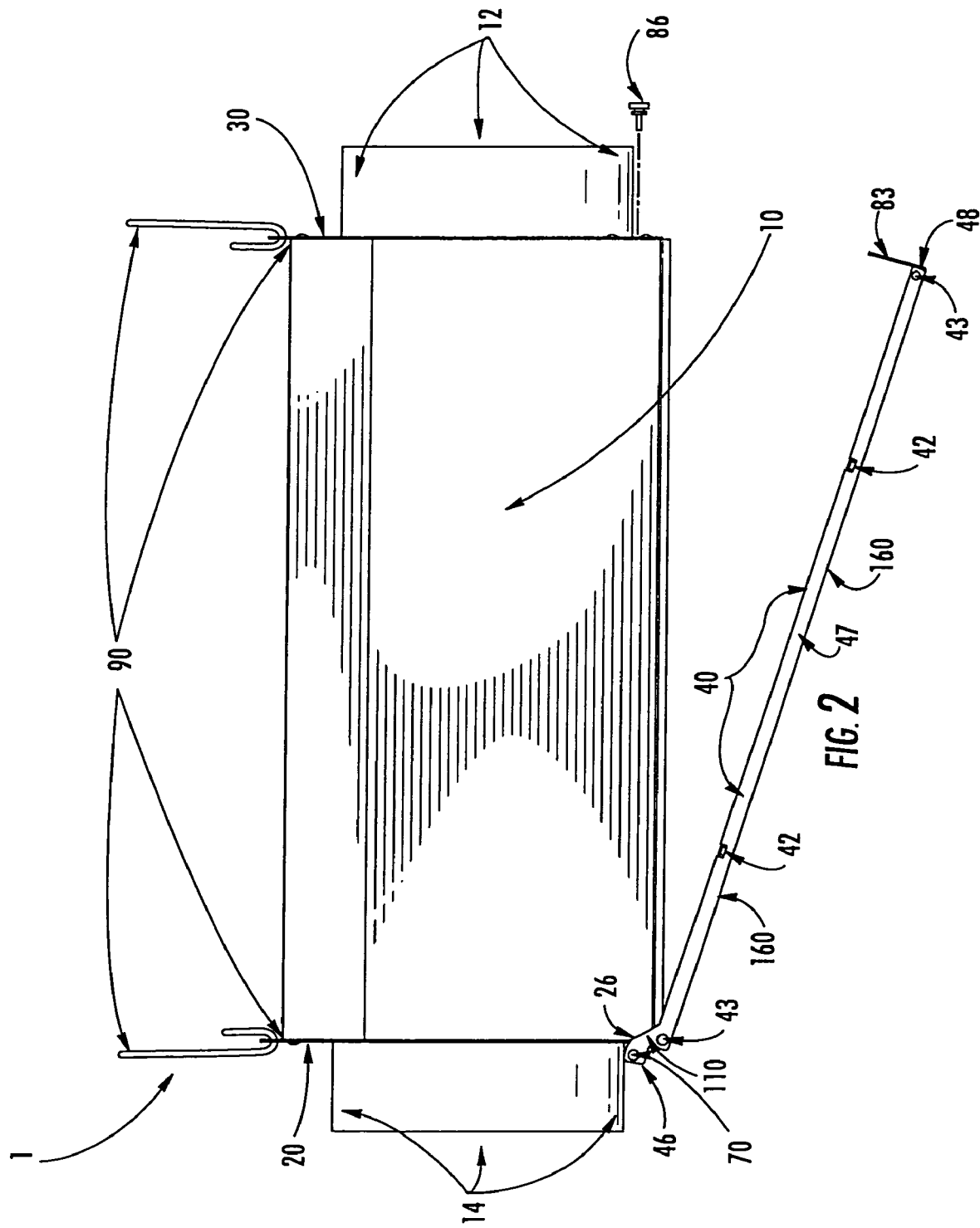
FIG. 2 is a side view of the embodiment illustrated in FIG. 1, wherein the horticulture light fixture 1 is illustrated having the glass retention frame 40 swung open.

FIG. 2:

FIG. 2 is a side view of the embodiment illustrated in FIG. 1, wherein the horticulture light fixture 1 is illustrated having the glass retention frame 40 swung open. As described in FIG. 1., the horticulture light fixture 1 in practice hangs above the plants, said hanger means 90 shown from the side, and attaching to top of housing 10. A first cylindrical vent 12 and second cylindrical vent 14 provides cooling atmosphere to the fixture. The glass retention frame 40 has a third edge 47 approximately matching the dimension of the housing 10.

On the fourth edge 48, a second vertical tab 83 extending perpendicular from the folded edge 160 of the glass retention frame 40, to provide a securing means for the glass retention frame 40 when in the closed position.

On the third edge 47, a second flange 110 is located on the end adjacent to the second edge 46. The second flange 110 is formed vertically from the glass retention frame 40, matching the second tab 26 of the second endplate 30. As shown, the second hinge pin 70 initially passes through the second flange 110 and secondarily into the second tab 26, forming second side of the hinge structure shown in FIG. 1, the fulcrum being defined by the location of the second hinge pin 70 relative to the glass retention frame 40 and second endplate 30. The second hinge pin 70 may be cylindrical, or some other shape that provides rotation of the second flange 110 about the second hinge pin 70. The second hinge pin 70 may also be threaded on one end providing a threaded securing method.

The first hinge pin 60 shown in FIG. 1 and the second hinge pin 70 shown in FIG. 2, must be axially aligned to provide smooth rotational movement. In the preferred embodiment, the location of the first hinge pin 60 and second hinge pin 70 are higher than the folded edge 160 of the glass retention frame 40.

Extending tabs 42 may be constructed from the same continuous sheet of metal that the glass retention frame 40 is constructed from. The extending tabs 42 are shown folded over as if they were retaining a piece of glass. A first corner rivet 43 may be used to secure the corners when a stronger glass retention frame 40 is desired.

Figure 3:
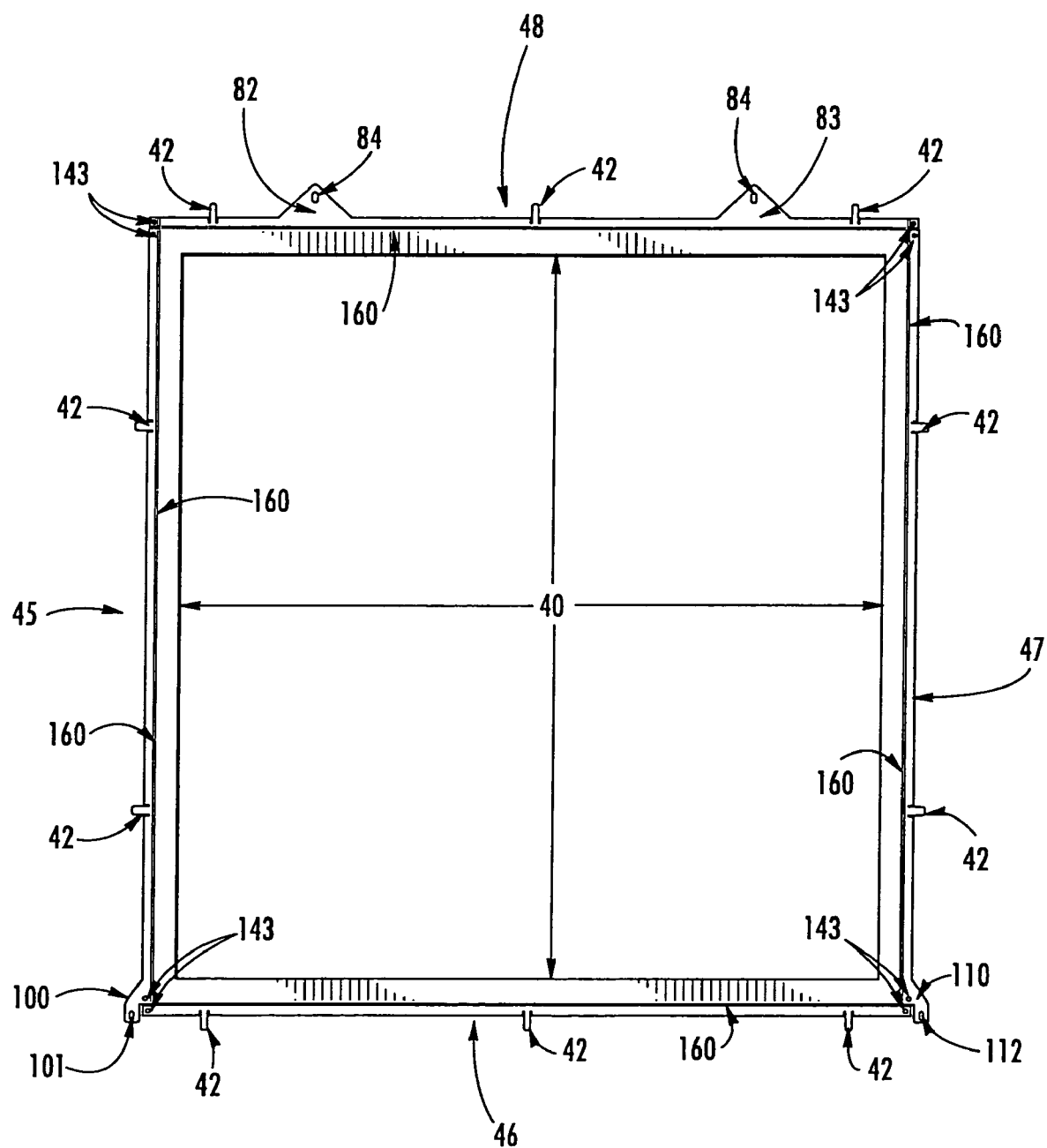
FIG. 3 is a top view of the glass retention frame 40 punched out of sheet metal, as a blank only, before breaking along desired fold lines.

FIG. 3:

FIG. 3 is a top side view of the glass retention frame 40 illustrated in FIG. 1 and FIG. 2, wherein the glass retention frame 40 has been punched or cut out from a continuous sheet of metal, but has not been folded, broke, or bent into shape. The glass retention frame 40 has a first edge 45, second edge 46, third edge, 47, and fourth edge 48. The dimension and size of the glass retention frame 40 matches the rectangular bottom defined by the housing 10, first endplate 20, and second endplate 30 shown in FIG. 1 and FIG. 2. As discussed above, the bottom of the housing 10 doesn't have to be rectangular, it could be square as depicted in FIG. 3.

On the first edge 45, a first flange 100 is located on the end adjacent to the second edge 46. The first flange 100 is punched or cut out with the glass retention frame 40 from a continuous sheet of metal. The first flange 100 also has a punched or cut first pivot hole 101. The first pivot hole 101 being of matching size and dimension as the first hinge pin 60 as shown in FIG. 1. and FIG. 2. The first edge 45 has two corner holes 143, that after bending, breaking or forming of the glass retention frame 40, may be riveted through or secured by other means to the second edge 46 and or fourth edge 48 for added strength and rigidity. The first edge 45 is shown with two extending tabs 42, each extending tabs 42 may be used to secure a piece of glass within the glass retention frame 40 by bending the extending tabs 42 over against the glass.

The second edge 46 has two corner holes 143, that after bending, breaking or forming of the glass retention frame 40, may be riveted through or secured by other means to the first edge 45 and or third edge 47 for added strength and rigidity. The second edge 46 is shown with three extending tabs 42, each extending tabs 42 may be used to secure a piece of glass within the glass retention frame 40 by bending the extending tabs 42 over and or against the glass.

On the third edge 47, a second flange 110 is located on the end adjacent to the second edge 46. The second flange 110 is punched or cut out with the glass retention frame 40. The second flange 110 also has a punched or cut second pivot hole 112. The second pivot hole 112 being of matching size and dimension as the second hinge pin 70 as shown in FIG. 1. and FIG. 2. The third edge 47 has two corner holes 143, that after bending, breaking or forming of the glass retention frame 40, may be riveted through or secured by other means to the second edge 46 and or fourth edge 48 for added strength and rigidity. The third edge 47 is shown with two extending tabs 42, each extending tabs 42 may be used to secure a piece of glass within the glass retention frame 40 by bending the extending tabs 42 over against the glass.

During bending, breaking or shaping, the first pivot hole 101 and second pivot hole 112 are axially aligned.

On the fourth edge 48, a first vertical tab 82 and second vertical tab 83 and securing holes 84 are punched and or cut from a continuous sheet of metal with the glass retention frame 40. The fourth edge 48 is shown with two extending tabs 42, each extending tabs 42 may be used to secure a piece of glass within the glass retention frame 40 by bending the extending tabs 42 over against the glass. The fourth edge 48 has two corner holes 143, that after bending, breaking or forming of the glass retention frame 40, the two corner holes 143 may be riveted through or secured together to the third edge 47 and or first edge 45 for added strength and rigidity.

The glass retention frame 40 is shown as being constructed from a single sheet of metal, however, the glass retention frame 40 may be constructed from multiple sheets of metal.

Figure 4:
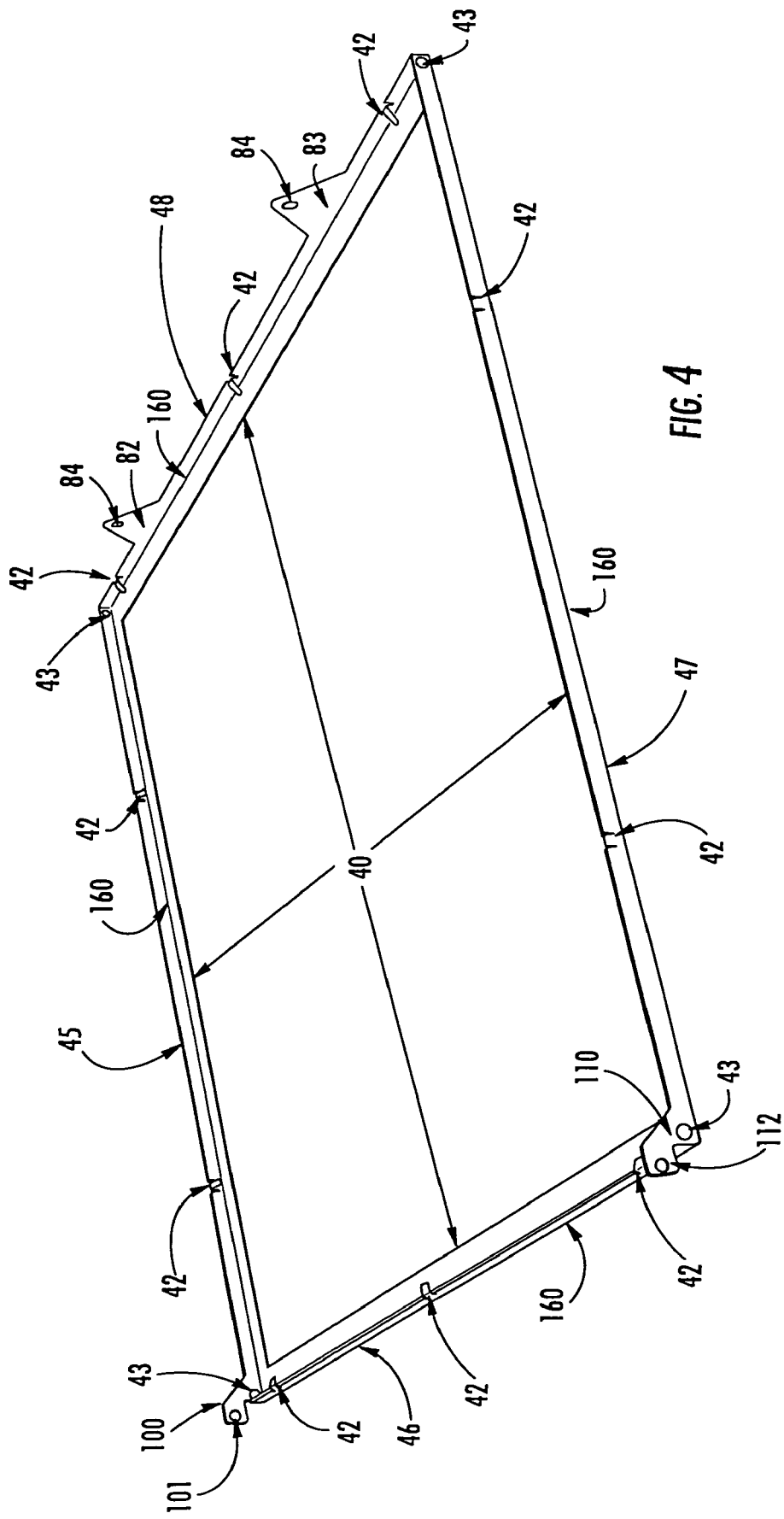
FIG. 4 is a perspective view of the glass retention frame 40 punched out of sheet metal, and broke or bent along desired fold lines.

FIG. 4:

FIG. 4 is a perspective view of the glass retention frame 40 illustrated in FIG. 1 and FIG. 2, wherein the glass retention frame 40 has been punched or cut out from a continuous sheet of metal, and folded, broke, or bent into shape. The glass retention frame 40 has a first edge 45, second edge 46, third edge, 47, and fourth edge 48. The dimension and size of the glass retention frame 40 matches the rectangular bottom defined by the housing 10, first endplate 20, and second endplate 30 shown in FIG. 1 and FIG. 2. In FIG. 3. glass retention frame 40 blank, unfolded, broke or shaped sheet metal was illustrated, and in FIG. 4. the folded, broke, or shaped sheet metal is illustrated. The folded edge 160 creates a general L shape on the first edge 45, second edge 46, third edge 47 and fourth edge 48.

On the first edge 45, a first flange 100 is located on the end adjacent to the second edge 46. The first flange 100 is punched or cut out with the glass retention frame 40, and shaped with the glass retention frame 40. The first flange 100 also has a punched or cut first pivot hole 101. The first pivot hole 101 being of matching size and dimension as the first hinge pin 60 as shown in FIG. 1. and FIG. 2. The first edge 45 has two corner holes 143 shown in FIG. 3., that after bending, breaking or forming of the glass retention frame 40, have been secured by corner rivets 43. The first edge 45 is shown with two extending tabs 42, each extending tabs 42 may be used to secure a piece of glass within the glass retention frame 40 by bending the extending tabs 42 over against the glass.

The second edge 46 has two corner holes 143 shown in FIG. 3., that after bending, breaking or forming of the glass retention frame 40, have been secured by corner rivets 43. The second edge 46 is shown with three extending tabs 42, each extending tabs 42 may be used to secure a piece of glass within the glass retention frame 40 by bending the extending tabs 42 over and or against the glass.

On the third edge 47, a second flange 110 is located on the end adjacent to the second edge 46. The second flange 110 is punched or cut out with the glass retention frame 40. The second flange 110 also has a punched or cut second pivot hole 112. The second pivot hole 112 being of matching size and dimension as the second hinge pin 70 as shown in FIG. 1. and FIG. 2. The third edge 47 has two corner holes 143 shown in FIG. 3., that after bending, breaking or forming of the glass retention frame 40, have been secured by corner rivets 43. The third edge 47 is shown with two extending tabs 42, each extending tabs 42 may be used to secure a piece of glass within the glass retention frame 40 by bending the extending tabs 42 over against the glass.

During bending, breaking or shaping, the first pivot hole 101 and second pivot hole 112 are axially aligned.

On the fourth edge 48, a first vertical tab 82 and second vertical tab 83 and securing holes 84 are punched and or cut from a continuous sheet of metal with the glass retention frame 40. The fourth edge 48 is shown with two extending tabs 42, each extending tabs 42 may be used to secure a piece of glass within the glass retention frame 40 by bending the extending tabs 42 over against the glass. The fourth edge 48 has two corner holes 143, that after bending, breaking or forming of the glass retention frame 40, the two corner holes 143 have been riveted through with corner rivets 43, to the third edge 47 and or first edge 45 for added strength and rigidity.

Figure 5:
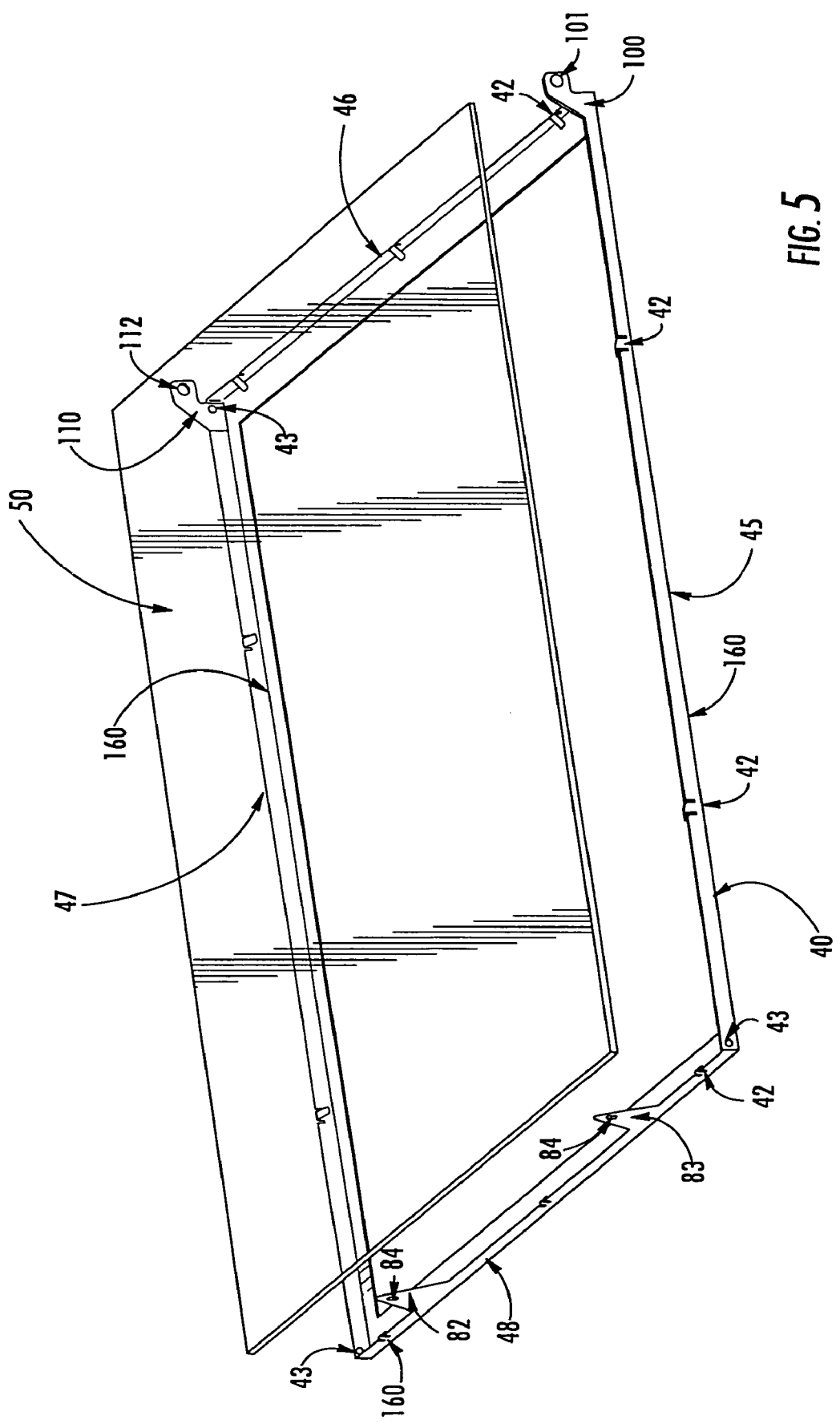
FIG. 5 is a perspective view of the glass retention frame 40 as illustrated in FIG. 4, including a glass portion 50 that fittingly inserts into the glass retention frame 40.

FIG. 5:

FIG. 5 is a perspective view of the glass retention frame 40 illustrated in FIG. 1 and FIG. 2, and FIG. 4 wherein the glass retention frame 40 has been punched or cut out from a continuous sheet of metal, and folded, broke, or bent into shape. The glass retention frame 40 has a first edge 45, second edge 46, third edge, 47, and fourth edge 48. The dimension and size of the glass retention frame 40 matches the rectangular bottom defined by the housing 10, first endplate 20, and second endplate 30 shown in FIG. 1 and FIG. 2. The glass portion 50 is dimensioned to fit within the glass retention frame 40, and under the extending tabs 42. The folded edge 160 creates a general L shape on the first edge 45, second edge 46, third edge 47 and fourth edge 48.

Figure 6:
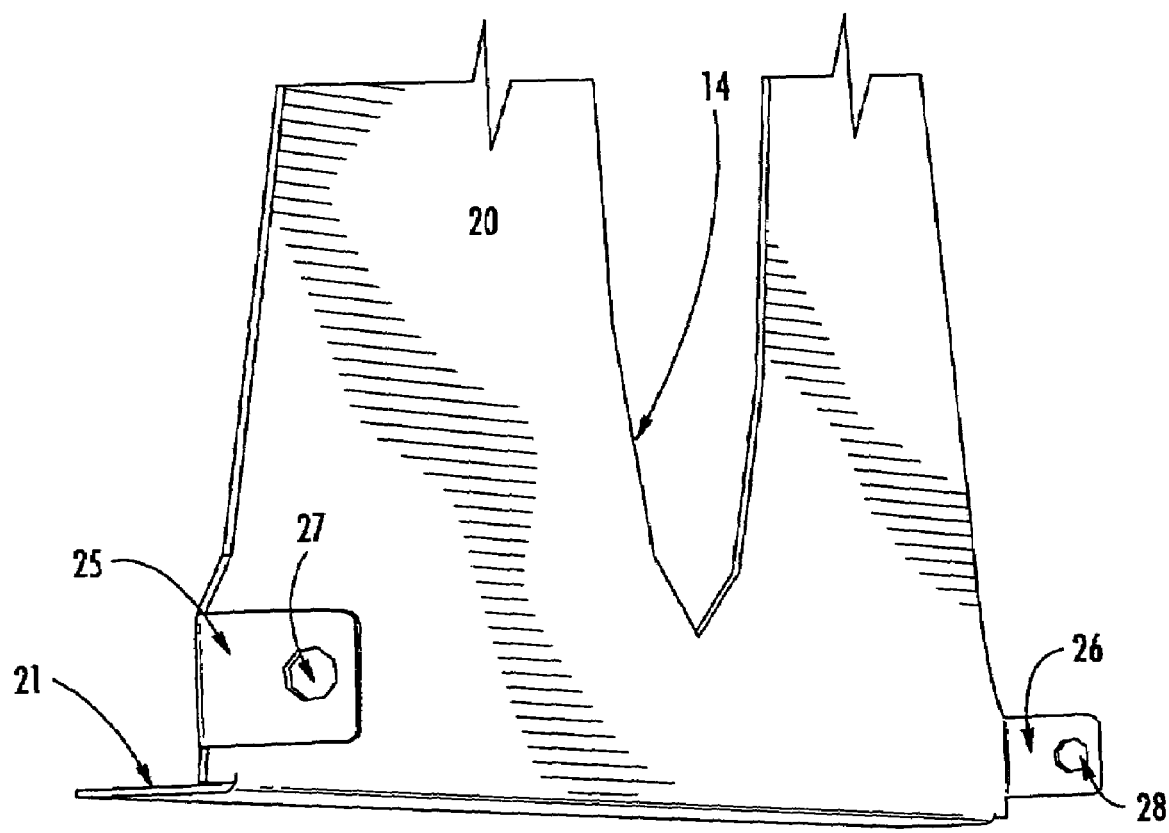
FIG. 6 is a cut away perspective view of the first end plate 20.

FIG. 6:

FIG. 6 is a cut away perspective view of the first end plate 20 having the second cylindrical vent 14 approximately centered. A lip 21 is folded at the bottom of the first endplate 20 to provide a stronger more rigid fixture.

First tab 25 and second tab 26 extend generally perpendicular from the first endplate 20. The first tab 25 has a punched or cut first fulcrum hole 27 and the second tab 26 and a second fulcrum hole 28. The first fulcrum hole 27 and second fulcrum hole 28 are axially aligned, and of lesser distance apart than the first flange 100 and second flange 110 shown in previous figures.

Figure 7:
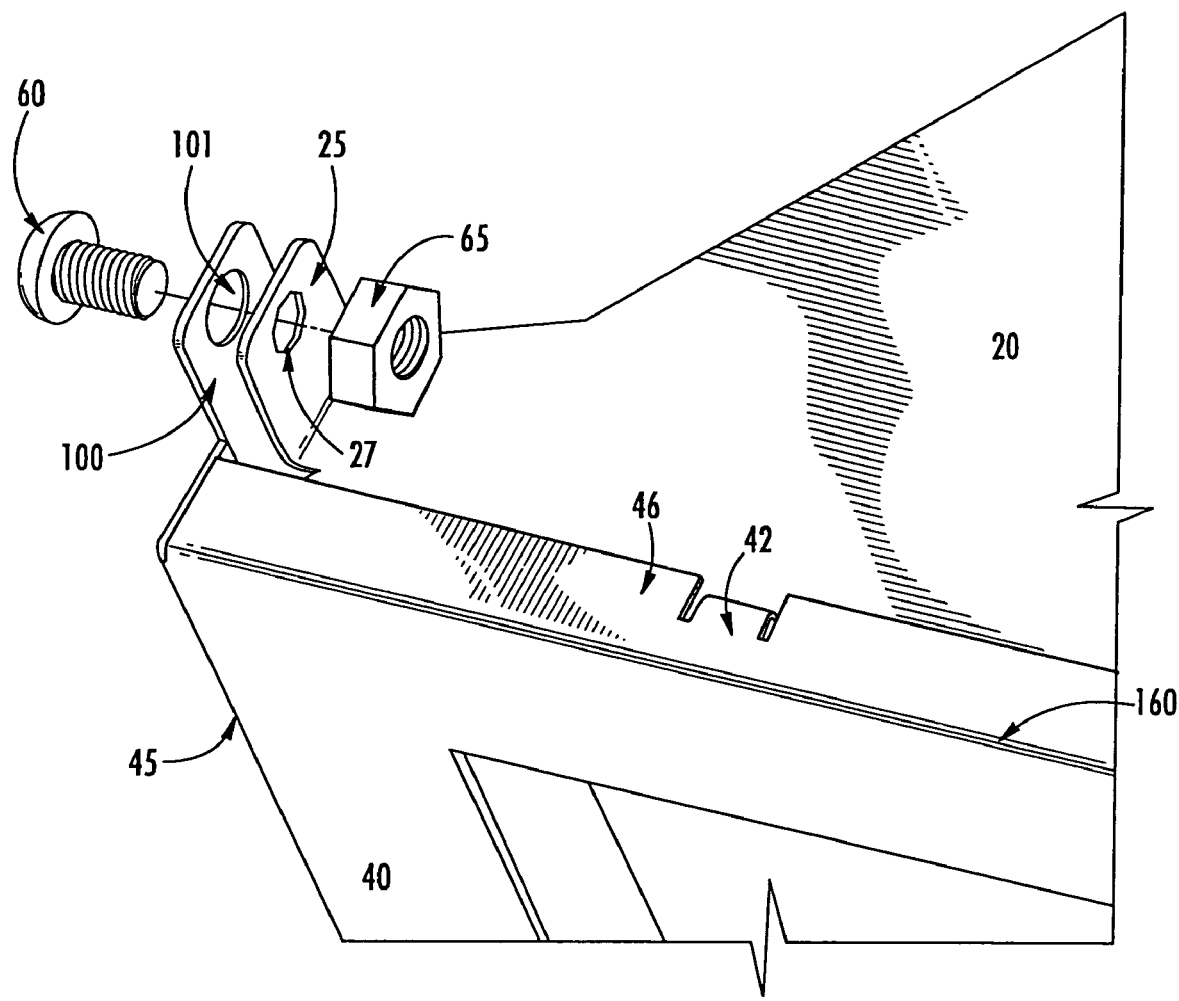
FIG. 7 is a cut away perspective view of the glass retention frame 40, first end plate 20, first hinge pin 60, illustrating assembly of the components.

FIG. 7:

FIG. 7 is a cut away perspective view of the glass retention frame 40, first end plate 20, first hinge pin 60, further illustrating assembly of the components. The first flange 100 being approximately parallel to the first tab 25, and the first pivot hole 101 axially aligned with the first fulcrum hole 27, the first hinge pin 60 inserts through the first pivot hole 101 and through the first fulcrum hole 27, forming an axis wherein the glass retention frame 40 rotates. The first hinge pin 60 is secured with a first pin nut 65. In the preferred embodiment, the first hinge pin 60 and or second hinge pin 70 are threaded, but one skilled in the art may use any of a variety of securing methods to ensure fixation.

One skilled in the art will understand that the above described embodiments are for purposes of illustration only and that alterations in the shape, changes in materials, and modifications in configuration may be made thereto without departing from the spirit and scope of the invention.

What is claimed is:

1. A horticulture light fixture comprising:

A housing, a first endplate, a second endplate, a glass retention frame, a glass portion, a first hinge pin, second hinge pin, and securing means;

The housing having an open bottom, a first open end, and second open end;

The first endplate constructed of sheet metal and attaching to the housing, covering the first open end and having a first tab and second tab;

The second endplate constructed of sheet metal and attaching to the housing, covering the second open end;

The first tab having a pivot hole and the second tab having a pivot hole, the pivot holes being axially aligned and axially spaced;

The glass retention frame constructed of sheet metal in size and dimension matching the open bottom, having a first edge, second edge, third edge, and fourth edge, the second edge and fourth edge being of length greater than the distance between the first tab and second tab;

The glass retention frame having a first flange constructed along the first edge against the second edge;

The glass retention frame having a second flange constructed along the third edge against the second edge;

The first flange having a pivot hole and the second flange having a pivot hole, the pivot holes being axially aligned;

The first flange pivot hole and first tab pivot hole being axially aligned and axially spaced to receive the first hinge pin through the first flange pivot hole and through the first tab pivot hole, providing rotation of the first flange around the axis of the first hinge pin;

The second flange pivot hole and second tab pivot hole being axially aligned and axially spaced to receive the second hinge pin through the second flange pivot hole and through the second tab pivot hole, providing rotation of the second flange around the axis of the second hinge pin;

Said glass portion fittingly rests within said glass retention frame;

Said glass portion and glass retention frame swings about the axis of the hinge pins covering the open bottom, attaching by securing means to the housing, first endplate, second endplate, or first and second endplates.

2. A horticulture light fixture comprising:

A housing, a first endplate, a second endplate, a glass retention frame, a glass portion, a first hinge pin, second hinge pin, and securing means;

The housing having an open bottom, a first open end, and second open end;

The first endplate constructed of sheet metal and attaching to the housing, covering the first open end and having a first tab;

The second endplate constructed of sheet metal and attaching to the housing, covering the second open end and having a second tab;

The first tab having a pivot hole and the second tab having a pivot hole, the pivot holes being axially aligned and axially spaced;

The glass retention frame constructed of sheet metal in size and dimension to cover the open bottom, having a first edge, second edge, third edge, and fourth edge, the second edge and fourth edge being of length greater than the distance between the first tab and second tab;

The glass retention frame having a first flange constructed along the first edge against the second edge;

The glass retention frame having a second flange constructed along the third edge against the second edge;

The first flange having a pivot hole and the second flange having a pivot hole, the pivot holes being axially aligned;

The first flange pivot hole and first tab pivot hole being axially aligned and axially spaced to receive the first hinge pin through the first flange pivot hole and through the first tab pivot hole, providing rotation of the first flange around the axis of the first hinge pin;

The second flange pivot hole and second tab pivot hole being axially aligned and axially spaced to receive the second hinge pin through the second flange pivot hole and through the second tab pivot hole, providing rotation of the second flange around the axis of the second hinge pin;

Said glass portion fittingly rests within said glass retention frame;

Said glass portion and glass retention frame swings about the axis of the hinge pins covering the open bottom, attaching by securing means to the housing or first endplate or second endplate, or first and second endplates.

3. A sheet metal hinge assembly according to claim 1 or claim 2 wherein the glass retention frame is constructed from a single continuous sheet of metal.

4. A sheet metal hinge assembly according to claim 1 or claim 2 wherein the first endplate, second endplate, or both first endplate and second endplate is constructed from a single sheet of metal.

* * * * *